(12) United States Patent
Yu

(10) Patent No.: US 9,307,268 B2
(45) Date of Patent: Apr. 5, 2016

(54) SYSTEM AND METHOD FOR PROVIDING VIDEO-ON-DEMAND (VOD) SERVICE IN NETWORK

(71) Applicant: INDUSTRIAL TECHNOLOGY RESEARCH INSTITUTE, Hsinchu (TW)

(72) Inventor: Yun-Shuai Yu, Changhua County (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 149 days.

(21) Appl. No.: 14/332,152

(22) Filed: Jul. 15, 2014

(65) Prior Publication Data

US 2015/0172728 A1    Jun. 18, 2015

(30) Foreign Application Priority Data

Dec. 16, 2013  (TW) .............................. 102146405 A

(51) Int. Cl.
*G06F 15/173* (2006.01)
*H04N 21/234* (2011.01)
(Continued)

(52) U.S. Cl.
CPC .............. *H04N 21/234* (2013.01); *H04L 67/00* (2013.01); *H04L 67/1085* (2013.01); *H04L 69/14* (2013.01); *H04N 21/238* (2013.01); *H04N 21/438* (2013.01); *H04N 21/4622* (2013.01);
(Continued)

(58) Field of Classification Search
CPC ............ H04N 21/234; H04N 21/4622; H04N 21/238; H04L 67/1085; H04L 69/14; H04L 67/00; H04L 21/00; H04L 21/437; H04L 29/08306; H04L 41/509; H04L 67/104; H04L 67/1091
See application file for complete search history.

(56) References Cited

U.S. PATENT DOCUMENTS

| 7,043,644 | B2 | 5/2006 | DeBruine |
| 7,155,487 | B2 | 12/2006 | Yau et al. |

(Continued)

FOREIGN PATENT DOCUMENTS

| CN | 102215435 A | 10/2011 |
| CN | 102479300 A | 5/2012 |

(Continued)

OTHER PUBLICATIONS

Taiwanese Office Action dated Jul. 27, 2015.
(Continued)

*Primary Examiner* — Krisna Lim
(74) *Attorney, Agent, or Firm* — Rabin & Berdo, P.C.

(57) ABSTRACT

A system for providing Video-on-Demand (VOD) service in a network includes a plurality of user devices and a server. Activation of an allowed transmission mode or a peer-to-peer transmission mode is dependent on whether a peer-to-peer transmission function of a first user device of the user devices is limited or not. The first user device calculates respective transmission rates of the two transmission modes to determine their respective download ranges. The transmission mode having a higher transmission speed downloads data close to a start of the target data and another transmission mode having a lower transmission speed downloads data close to an end of the target data. Based on the target data temporarily stored in other user devices, the first user device assigns each of the two transmission modes a download sequence of a plurality of clips of the target data to download the clips of the target data.

18 Claims, 6 Drawing Sheets

(51) Int. Cl.
  *H04N 21/238* (2011.01)
  *H04N 21/438* (2011.01)
  *H04N 21/462* (2011.01)
  *H04L 29/06* (2006.01)
  *H04L 21/00* (2006.01)
  *H04L 29/08* (2006.01)
  *H04L 12/24* (2006.01)

(52) U.S. Cl.
  CPC ........... *H04L 21/00* (2013.01); *H04L 29/08306* (2013.01); *H04L 41/509* (2013.01); *H04L 67/104* (2013.01); *H04L 67/1091* (2013.01)

(56) References Cited

U.S. PATENT DOCUMENTS

| | | | |
|---|---|---|---|
| 7,646,775 B2 | 1/2010 | Capone et al. | |
| 8,201,164 B2* | 6/2012 | Reus | G06F 8/60 709/225 |
| 2003/0221009 A1 | 11/2003 | Standridge et al. | |
| 2009/0182815 A1* | 7/2009 | Czechowski, III | H04L 67/104 709/206 |
| 2010/0146569 A1* | 6/2010 | Janardhan | H04N 7/17318 725/98 |
| 2013/0124747 A1* | 5/2013 | Harrang | H04L 1/0002 709/231 |
| 2013/0142038 A1* | 6/2013 | Pan | H04L 47/283 370/230 |

FOREIGN PATENT DOCUMENTS

| | | | |
|---|---|---|---|
| CN | 102726053 A | 10/2012 | |
| CN | 102802041 A | 11/2012 | |
| TW | 200849918 A | 12/2008 | |
| TW | 201138399 A | 11/2011 | |

OTHER PUBLICATIONS

Li Zhao et al., "Gridmedia: A Practical Peer-to-Peer Based Live Video Streaming System" 2005 IEEE 7th Workshop on Multimedia Signal Processing, pp. 1-4, Oct. 2005.

Dennis Schwerdel et al., "ChordNet: A Chord-based self-organizing super-peer network" 2011 7th EURO-NGI Conference on Next Generation Internet (NGI), pp. 1-8, Jun. 2011.

Luigi Ciminiera et al., "Distributed Connectivity Service for a SIP Infrastructure" IEEE Network, vol. 22, Issue 5, pp. 33-40, Sep. 2008.

Miquel Martin et al., "Path-coupled signaling for NAT/Firewall traversal" 2005 Workshop on High Performance Switching and Routing, 2005. HPSR, pp. 231-235, May 2005.

Wookyun Kho et al., "Skype Relay Calls: Measurements and Experiments" IEEE Infocom Workshops 2008, pp. 1-6, Apr. 2008.

Jianhua Ma et al., "A P2P Groupware System with Decentralized Topology for Supporting Synchronous Collaborations" Proceedings of the 2003 International Conference on Cyberworld, pp. 54-61, Dec. 2003.

Cisco Systems, Inc. "Not All 802.11ac Solutions Work the Way You Want" Cisco Systems, Inc. [Online]. <http://www.cisco.com>.

Smooth Wall. "Welcome to Smoothwall Express" (2010) Express Open Source Firewall Project. [Online]. http://www.smoothwall.org.

Ghulam Mujtaba et al., "Detection of Applications within Encrypted Tunnels Using Packet Size Distributions" International Conference for Internet Technology and Secured Transactions, ICITST 2009, pp. 1-6, Nov. 2009.

\* cited by examiner

SYSTEM AND METHOD FOR PROVIDING VIDEO-ON-DEMAND (VOD) SERVICE IN NETWORK

This application claims the benefit of Taiwan application Serial No. 102146405, filed Dec. 16, 2013, the disclosure of which is incorporated by reference herein in its entirety.

TECHNICAL FIELD

The disclosure relates in general to a system and method for providing video-on-demand service in network.

BACKGROUND

Peer-to-peer (P2P) of Video-on-demand (VOD) service may be used to reduce bandwidth loading of video content provider. However, the internet service provider (ISP) may use Firewall to block P2P flow or to limit search efficiency and transmission rate of P2P service. Thus, the user device which is blocked by Firewall (which is also called "blocked user device") has difficulty in exchanging data with public user devices outside the Firewall. Further, as P2P technology is advanced, the ISP will also enhance their Firewall.

Thus, how to efficiently provide VOD service in network is a target.

SUMMARY

According to one embodiment, a network video-on-demand (VOD) service system is provided. The VOD service system includes: a plurality of user devices; and a server, coupled to the user devices. In downloading a target data, if a P2P (peer-to-peer) transmission function of one of the user devices is limited, the user device activates an allowed transmission mode. If the P2P transmission function of one of the user devices is not limited, the user device selectively activates the allowed transmission mode and a P2P transmission mode. The user device analyzes transmission rates of the allowed transmission mode and the P2P transmission mode to determine download ranges of the allowed transmission mode and the P2P transmission mode. One of the allowed transmission mode and the P2P transmission mode having a higher transmission rate downloads a region close to a start of the target data, while the other of the allowed transmission mode and the P2P transmission mode having a lower transmission rate downloads a region close to an end of the target data. Based on a target data storage status of other user devices, the user device assigns download sequences of the allowed transmission mode and the P2P transmission mode in downloading a plurality of clips of the target data, to download the clips of the target.

According to another embodiment, a network video-on-demand (VOD) service method is provided. The method detects whether a P2P (peer-to-peer) transmission function of a user device is limited. If the P2P transmission function of the user device is limited, an allowed transmission mode of the user device is activated. If the P2P transmission function of the user device is not limited, at least one of the allowed transmission mode and a P2P transmission mode of the user device is selectively activated. Transmission rates of the allowed transmission mode and the P2P transmission mode of the user device are analyzed to determine download ranges of the allowed transmission mode and the P2P transmission mode. One of the allowed transmission mode and the P2P transmission mode having a higher transmission rate is assigned to download a region close to a start of the target data, while the other of the allowed transmission mode and the P2P transmission mode having a lower transmission rate is assigned to download a region close to an end of the target data. Based on a target data storage status of other user devices, download sequences of the allowed transmission mode and the P2P transmission mode in downloading a plurality of clips of the target data are assigned to download the clips of the target.

Figure 1:
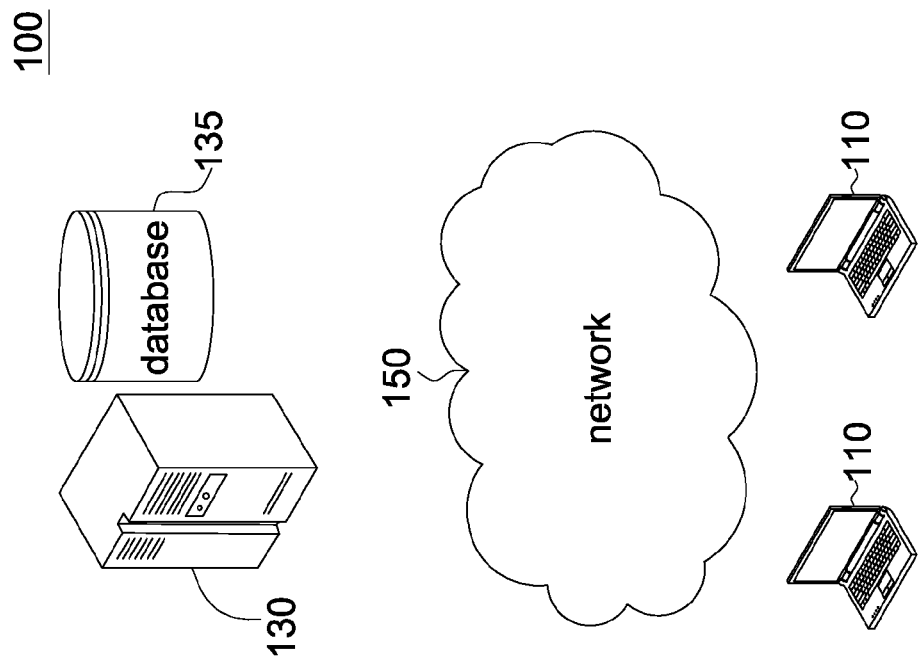
FIG. 1 shows a system diagram for providing VOD service in network according to an embodiment of the disclosure.
Figure 1:
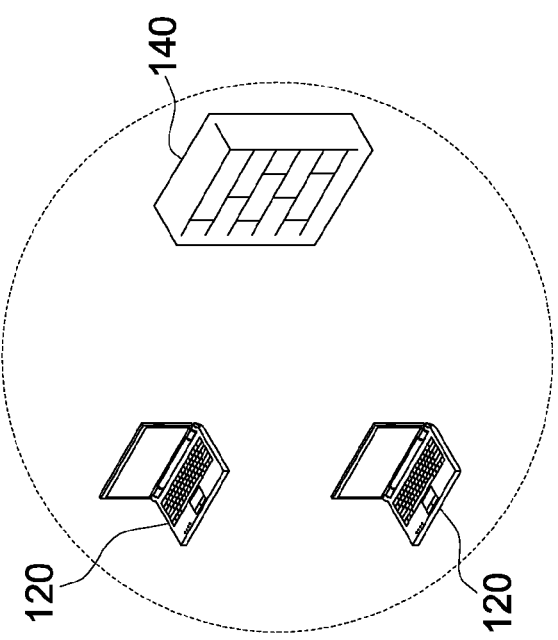

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms of the disclosure are based on general definition in the technical field of the disclosure. If the disclosure describes or explains one or some terms, definition of the terms is based on the description or explanation of the disclosure. Description of common technologies or principles of this technical field will be omitted if they are not related to technical features of the application. Shapes, sizes and ratios of the objects are exemplary for one skilled person in the art to understand the disclosure, not to limit the scope of the disclosure.

Each of the disclosed embodiments has one or more technical features. In possible implementation, one skilled person in the art would selectively implement part or all technical features of any embodiment of the disclosure or selectively combine part or all technical features of the embodiments of the disclosure based on the disclosure of the disclosure and his/her own need.

In the following, the term "Firewall Allowed Transmission Mode, FATM" refer to a transmission mode which is defined by the ISP (for example, an average bandwidth of a data flow should be under 1 Mbps) or a transmission mode which is allowed by the ISP (for example, transmission behavior of traditional network application, such as web page browsing or ftp transmission). Transmission behavior of traditional network application refers to that the user device connects to a few servers and the connection time is usually long. However, in P2P connection, the user device may connect to many other user devices at the same time and the connection time is relatively short.

The embodiment of the disclosure is related to a system and a method for providing VOD service in network. When the user device of the system is blocked by a firewall, the user device transmits data in the FATM. When the user device is not blocked by the firewall, the user device may transmit data in the FATM or the P2P transmission mode. Besides, when the user device downloads data, the download tasks of the two transmission modes are dynamically adjusted based on the download rates and status of the two transmission modes.

Now refer to FIG. 1 which shows a system diagram for providing VOD service in network according to an embodiment of the disclosure. The VOD service system 100 includes: a plurality of user devices 110, 120 and a server 130. The server 130 includes a database 135 which records data about the treatment of P2P flow by each ISP. When the user device 110 or 120 logs into the VOD service system 100, the user device 110 or 120 sends a message to the server 130. The server 130 may request the database 135 to identify that which ISP provides service to the user device, and then notifies that whether the user device 110/120 is blocked by a firewall of the ISP or not.

If blocked by a firewall of the ISP, then the user device sets itself as a blocked user (that is, the user device 120 is blocked by the firewall 140). If not, the user device sets itself as a public user (i.e. the user device 110). The user device 110/120 may be coupled to each other via the network 150. P2P transmission function of the public user is not limited but P2P transmission function of the blocked user is limited.

In order to not to be in the blacklist of the ISP, the blocked user 120 activates FATM to transmit data between the public user 110 or other blocked user 120. When the public user 110 detects that other public user 110 is watching the same channel, the public user 110 activates the P2P transmission mode to exchange data (for example, video data) with other public users 110. When the public user 110 detects that a blocked user 120 is watching the same channel, the public user 110 activates the FATM to exchange data (for example, video data) with the blocked user 120. When the public user 120 activates the two transmission modes (FATM and the P2P transmission mode) at the same time, the public user 110 will arbitrate to prevent the two transmission mode from downloading the same data clip, so as to prevent bandwidth waste.

Figure 2:
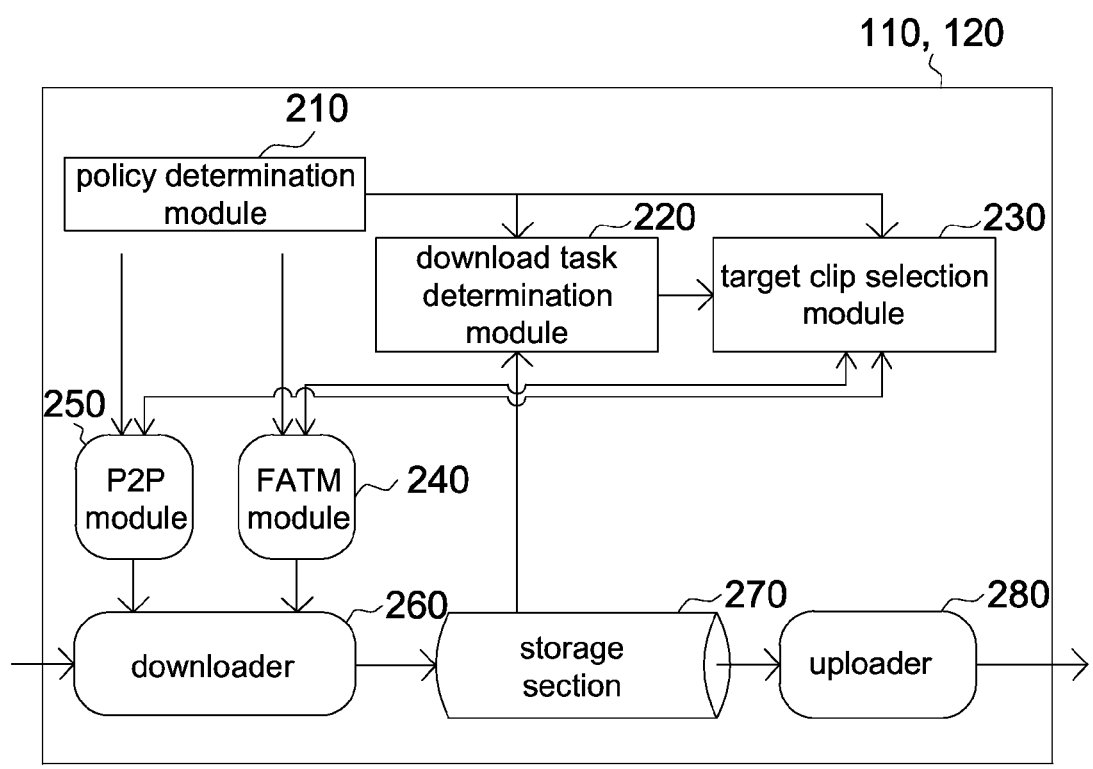
FIG. 2 shows a block functional diagram for a user device according to an embodiment of the disclosure.

Now refer to FIG. 2 which shows a block functional diagram for a user device 110/120 according to an embodiment of the disclosure. The user device 110/120 includes a policy determination module 210, a download task determination module 220, a target clip selection module 230, a FATM module 240, a P2P module 250, a downloader 260, a storage section 270 and an uploader 280. An example of downloading video data is described in the following. The video data is divided into a lot of video clips. In downloading, the user device does not download the whole video data in one time, but to download the video clips one by one.

The policy determination module 210 detects whether a firewall which blocks or limits P2P flow exists in the network of the user device 110/120 or not. That is, the policy determination module 210 detects whether the firewall of the ISP providing service to the user device 110/120 blocks or limits P2P flow. Based on (1) information about whether the firewall blocks or limits P2P flow and (2) the information about whether there are other public users or blocked users watching the same channel, the policy determination module 210 determines to activate the P2P transmission mode or FATM. When both transmission modes are activated, the policy determination module 210 enables the download task determination module 220 and the target clip selection module 230. If only one of the P2P transmission mode and the FATM is activated, then the policy determination module 210 disables the download task determination module 220 and the target clip selection module 230. Details of the policy determination module 210 are described later.

In other words, the policy determination module 210 determines to activate either the P2P transmission mode or the FATM based on whether there is a firewall which blocks or limits P2P flow, the network environment of other user devices and the data storage status of other user devices. Although activation of more transmission mode increases transmission efficiency, this also increases control cost and computation cost. Thus, in the embodiment of the disclosure, if the public user detects there are other blocked user watching the same channel, the public user activates the FATM. If the public user detects there are other public user watching the same channel, the public user activates the P2P transmission mode.

The download task determination module 220 periodically checks the status of the storage section 270 to analyze the respective transmission rates of the two transmission modes and to estimate the new respective download ranges of the two transmission modes. The download task determination module 220 informs the target clip selection module 230 about the new download range and about which video clips are not downloaded completely yet.

The target clip selection module 230 determines the download sequence of the two transmission modes in downloading the target video clips, based on the information from the download task determination module 220 and the storage status of other user devices collected by the FATM module 240 and the P2P module 250, and informs the FATM module 240 and the P2P module 250 of the determination.

The FATM module 240 performs FATM algorithm (for example, requesting a centralized tracker server which records rough information about storage contents of users) to identify which video clips are owned by other public users and other block users.

The P2P module 250 performs P2P algorithm (for example, BitTorrent algorithm) to identify which video clips are owned by other public users. If the P2P algorithm performed by the P2P module 250 is well known, then the public user applying the embodiment of the disclosure may exchange (video) data with the public user which does not apply the embodiment of the disclosure. Thus, in this situation, "the public user applying the embodiment of the disclosure" and "the public user which does not apply the embodiment of the disclosure" are both referred as a public user. On the contrary, if the P2P algorithm performed by the P2P module 250 is not well known, then the public user which does not apply the embodiment of the disclosure cannot obtain data from the public user applying the embodiment of the disclosure. Thus, in this situation, the public user includes "the public user applying the embodiment of the disclosure", but not "the public user which does not apply the embodiment of the disclosure".

The downloader 260 downloads video clips (for example, each video clip having one minute video). In details, the downloader 260 downloads the target video clips specified by the FATM module 240 and the P2P module 250 and stores into the storage section 270. The uploader 280 uploads to other user 110/120 video clips stored in the storage section 270.

The elements 210~250, 260 and 280 may be implemented by software or hardware.

Figure 3:
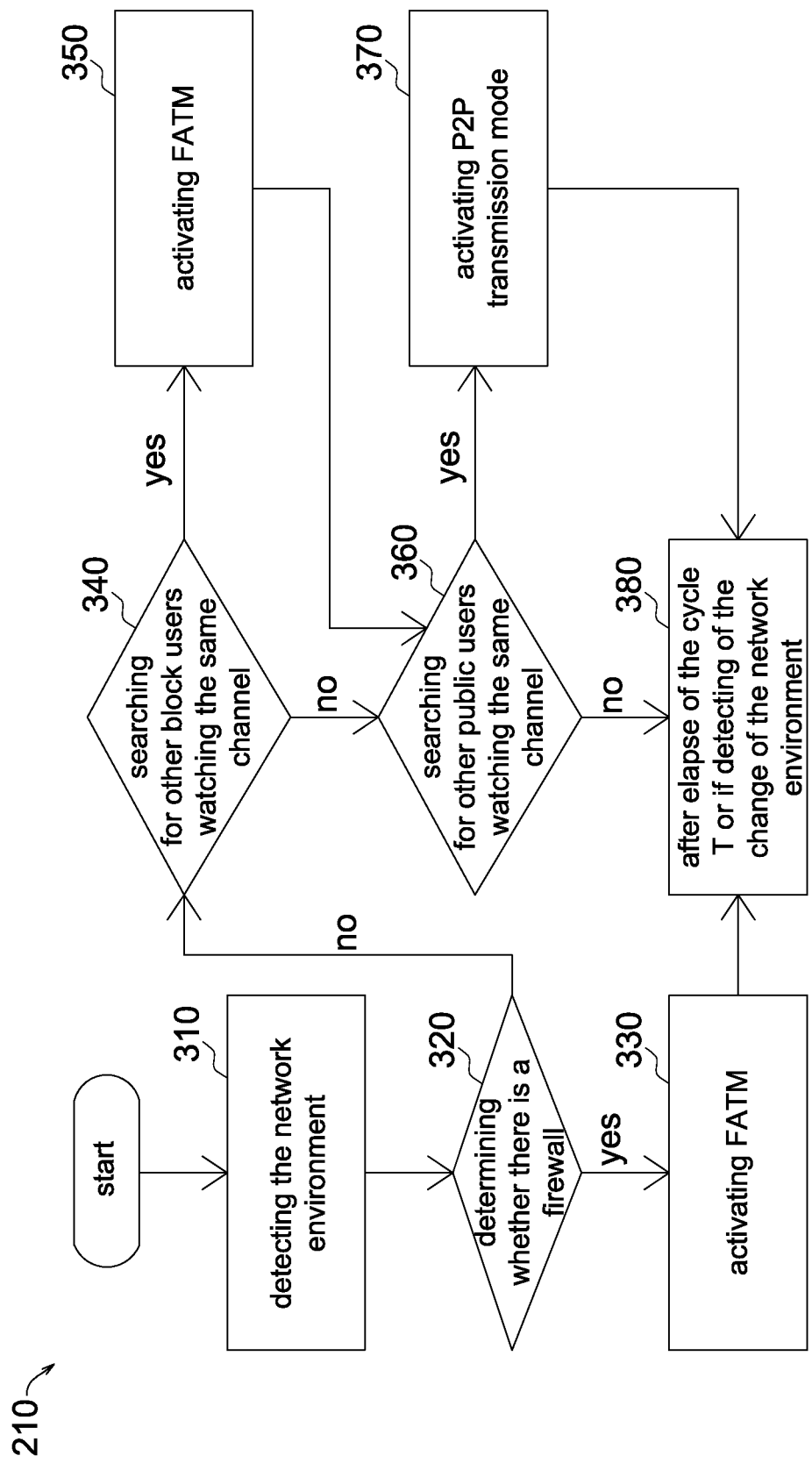
FIG. 3 shows a policy determination flow for a policy determination module according to an embodiment of the disclosure.

FIG. 3 shows a policy determination flow for the policy determination module 210 according to an embodiment of the disclosure. The flow in FIG. 3 may be triggered by for example, addition of new user device 110/120 into the VOD service system 100, or elapse of a cycle T (for example, the cycle T is one minute but the application is not limited by), or a situation that the user device 110/120 detects change of a underlying network. Here, change of a underlying network refers to that, if the user device 110/120 is in roaming, then the network environment of the user device 110/120 may be changed (for example, the user device may roam from a network having a firewall into a network without a firewall (or vice versa)). Thus, in step 310, the policy determination module 210 checks whether a firewall blocking or limiting P2P flow exists in the network environment of the user device or not. For example, the server 130 receives the information from the user device to check the source address of the network layer header of the information, for determining which ISP provides service to the user device. Then the server 130 requests the database 135 (which records a list of ISP that blocks or limits P2P flow). The server 130 informs the request result to the user device 110/120.

Or, the user device 110/120 may try to connect to P2P server. If the connection is successful, then in the network environment, there is no firewall which blocks P2P flow. On the contrary, if the connection is failed, then in the network environment, there is a firewall which blocks P2P flow. However some firewall may block the user device because of this connection try from the user device.

In the step 320, based on the detection result, the policy determination module 210 determines whether there is a firewall in the network environment of the user device. If yes (the user device will defined as a blocked user), the user device activates the FATM in order not to be blocked by the firewall, as shown in step 330.

In step 330, the policy determination module 210 enables the FATM module 240 and informs the FATM module 240 about which ISP provides service to the user device. That is because different ISP may have different limitation on P2P transmission. For example, ISP A may limit P2P average flow under 1 Mbps but ISP B may limit the number of connections between the user device and other devices should be less than 10. The information is established in advance. The FATM module 240 performs the FATM based on limitation of the ISP.

If step 320 is no (that is, the firewall in the network of the user device will not limit or block P2P flow), the user device (which will be set as a public user) searches for other block users watching the same channel, as step 340. If yes in step 340, then the policy determination module 210 enables the FATM (i.e. the FATM module 240 is enabled), as step 350. If no in step 340, then the policy determination module 210 disables the FATM (i.e. the FATM module 240 is disabled).

In step 360, the user device searches for other public users watching the same channel. If yes in step 360, then the policy determination module 210 enables the P2P transmission mode (i.e. the P2P module 250 is enabled), as step 370. If no in step 360, then the policy determination module 210 disables the P2P transmission mode (i.e. the P2P module 250 is disabled).

In step 380, after every cycle T is elapsed or if the change of the network environment is detected, then the flow jumps to step 310.

By the flow in FIG. 3, the policy determination module 210 decides to enable the FATM and/or the P2P transmission mode.

Figure 4:
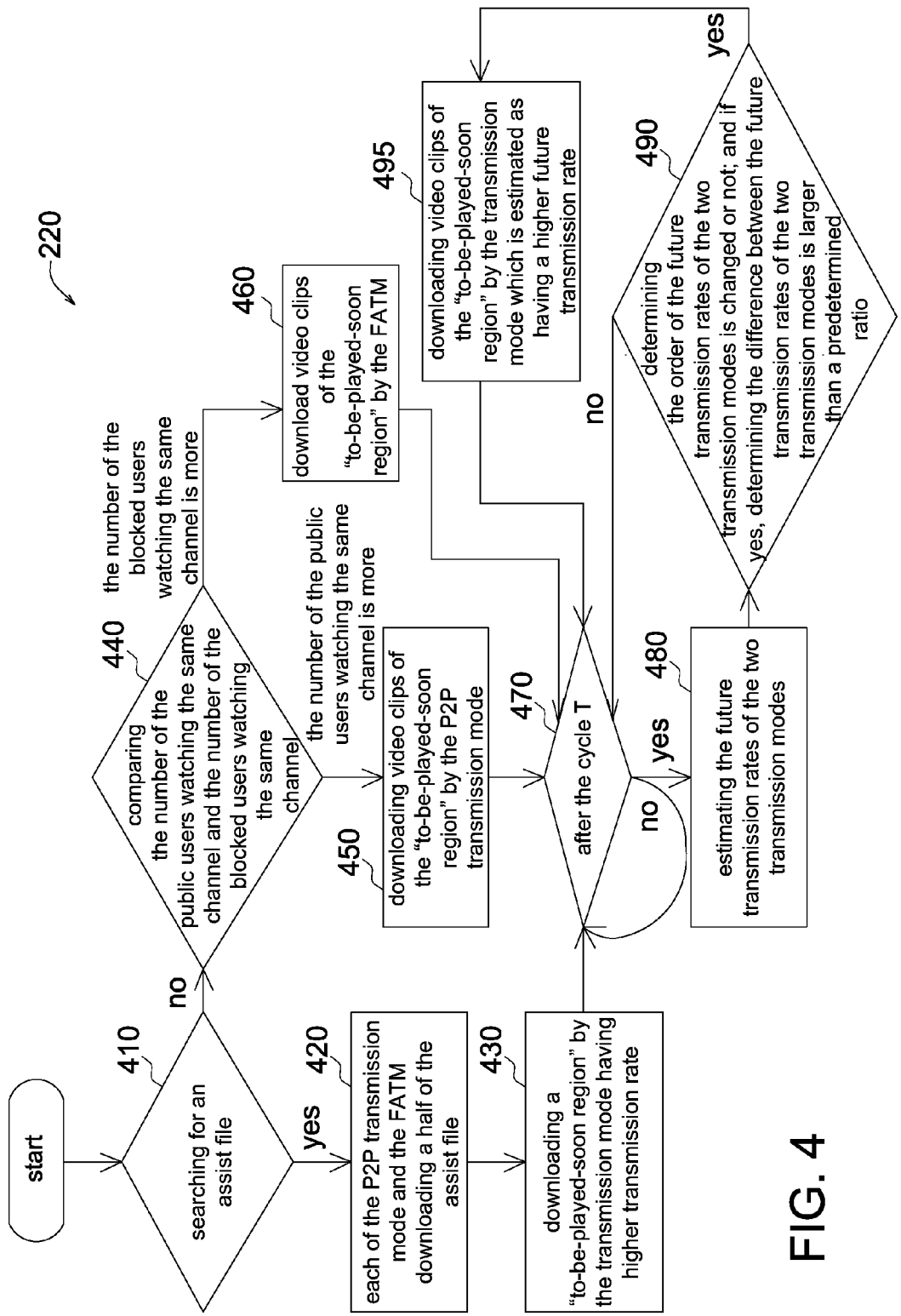
FIG. 4 shows a download task determination flow for a download task determination module according to an embodiment of the disclosure.

Now refer to FIG. 4 which shows a download task determination flow for a download task determination module according to an embodiment of the disclosure. As shown in FIG. 4, in step 410, it is determined that whether the video data to be downloaded has an assist file or not. The assist file refers to a description file or a commercial video file. The description file describes the address of a key frame of every second of the video data, and the description file is usually used to support change of playback offset. If the assist file exists, then the user device downloads the assist file first, for testing transmission rates of the P2P transmission mode and the FATM. In step 420, each the P2P transmission mode and the FATM downloads a half of the assist file. By this, which of the P2P transmission mode and the FATM has higher transmission rate may be determined.

In step 430, the transmission mode having higher transmission rate is used to download "to-be-played-soon region". In the embodiment, the video data to be downloaded may include two regions, a "to-be-played-soon region" and a "to-be-played-later region". The "to-be-played-soon region" refers to a former region (i.e. the region close to the beginning of the video data or close to the current play time) and the "to-be-played-later region" refers to the region close to the end of the video data. Because the user device plays the "to-be-played-soon region" earlier than the "to-be-played-later region", thus "to-be-played-soon region" is downloaded by the transmission mode having higher transmission rate, and the "to-be-played-later region" is downloaded by the transmission mode having lower transmission rate.

Figure 5:
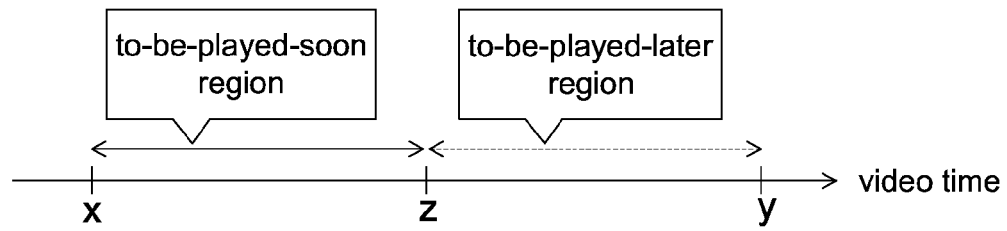
FIG. 5 shows a "to-be-played-soon region" and a "to-be-played-later region" according to an embodiment of the disclosure.

FIG. 5 shows "to-be-played-soon region" and "to-be-played-later region" according to an embodiment of the disclosure. In FIG. 5, the parameter "x" refers to the not-completely-downloaded video clip having earliest play time (the initial x is the beginning of the video data (i.e. the play time is "0")). The parameter "y" refers to the not-completely-downloaded video clip having latest play time (the initial y is the end of the video data). The parameter "z" refers to a separation point. If the user device downloads other type data rather than the video data, then the parameters "x" and "y" may be referred as the file offset.

If in step 410, no assist file is found, then the number of the public users watching the same channel and the number of the blocked users watching the same channel are compared, as step 440. The reason of step 440 relies on that, in case of more users, it has higher chances to select the data provider having higher bandwidth. If the number of the public user watching the same channel is more, then the P2P transmission mode is selected to download the video clips of the "to-be-played-soon region", as step 450. If the number of the blocked user watching the same channel is more, then the FATM is selected to download the video clips of the "to-be-played-soon region", as step 460.

In step 470, whether the cycle T is elapsed is determined. If yes, then in step 480, which of the two transmission modes has higher transmission rate in the future is determined based on the past download situation. Details will be described later.

In the step 490, it is determined that the order of the future transmission rates of the two transmission modes is changed or not. If yes, then it is determined that the difference between the future transmission rates of the two transmission modes is larger than a predetermined ratio.

If yes in step 490, then the transmission mode which is estimated as having a higher future transmission rate is selected to download the video clips of the "to-be-played-soon region", as step 495. If no step 490, then the download tasks of the two transmission modes remain unchanged.

For example, if the P2P transmission mode has higher transmission rate (for example, 10 Kbps) and the FATM has lower transmission rate (for example, 3 Kbps). After the estimation of step 480, the future transmission rate of the FATM becomes higher (for example, 18 Kbps) and the future transmission rate of the P2P transmission mode becomes lower (for example, 9 Kbps), and the difference between the transmission rates of the two transmission modes is higher than the predetermined ratio, then in step 495, after selection, the FATM is selected to download the "to-be-played-soon region" and the P2P transmission mode is selected to download the "to-be-played-later region".

Now two ways to estimate the future transmission rate are described.

In the P2P transmission mode, in the n-th estimation (that is, when n-th cycle is elapsed), the average actual transmission rate of the P2P transmission mode in the n-th cycle is expressed as a(n). The estimated transmission rate of the P2P transmission mode in the next cycle is expressed as A(n).

In the FATM, in the n-th estimation (that is, when n-th cycle is elapsed), the average actual transmission rate of the FATM in the n-th cycle is expressed as b(n). The estimated transmission rate of the FATM in the next cycle is expressed as B(n).

In the first way for estimating the future transmission rate, A(n) is set as a(n) and B(n) is set as b(n), which is easy to implement.

In the second way for estimating the future transmission rate, the actual transmission rates in the past h+1 (0<h<n) cycles are weighted by respective weight parameters and then added. The actual transmission rates in the earlier cycles is weighted by a smaller weight parameter, and the actual transmission rates in the later cycles is weighted by a larger weight parameter. This estimation will not be easily influenced by sudden network change in the recent cycles.

One possible implementation of weight assignment is as follows:

$$A(n)=a(n)+\gamma a(n-1)+\gamma^2 a(n-2)+ \ldots +\gamma^h a(n-h)$$

$$B(n)=b(n)+\gamma b(n-1)+\gamma^2 b(n-2)+ \ldots +\gamma^h b(n-h)$$

$$0<\gamma<1, 0<h<n, h \in N$$

Now, how the target clip selection module 230 determines respective download tasks of the FATM module 240 and the P2P module 250 is described. Refer to FIG. 5 again. For simplicity, the user device downloads the video from the beginning of the video data, which is not to limit the application.

How to determine the parameter "z" relies on whether there is the assist file. If no assist file, then the parameter "z" is set as a center point of the parameters "x" and "y". That is because, as described above, without the assist file, then it is difficult to estimate the initial transmission rates of the two transmission modes. Thus, in this situation, the initial transmission rates of the two transmission modes are supposed to be the same and accordingly, the initial value of the parameter "z" is set as z=(x+y)/2.

If there is the assist file, as described above, after each of the two transmission modes downloads a half of the assist file, the initial transmission rates of the two transmission modes are estimated. Supposed the initial transmission rates of the two transmission modes are estimated as "a" and "b" (a>b). The parameter "z" is set as: (z-x): (y-z)=a:b.

The video clips between z and x (that is, the video clips in the "to-be-played-soon region") are downloaded by the transmission mode having higher transmission rate; and the video clips between z and y (that is, the video clips in the "to-be-played-later region") are downloaded by the transmission mode having lower transmission rate.

In details, because the playback deadline of the video clips between x and z are earlier, the download sequence is from x to z (that is, the video clip having earliest play time is downloaded firstly). In here, "playback deadline" refers to a play time difference between a video clip to the one currently played. If the video clip has contents from the $5^{th}$~$6^{th}$ minute video, the current play time is the third minute, then the playback deadline of the video clip is 2 minutes. If in the "to-be-played-soon region", the number of the video clips which are downloaded completely reach a threshold (for example, there are already 10 video clips in the "to-be-played-soon region" are downloaded completely), then the download mode may be set as "Scarcity-first" (that is, the video clips which are owned by fewest users are downloaded first) to increase the chance of downloading data. Further, if in the "to-be-played-soon region", the number of the video clips which are downloaded completely reach a threshold and the video clips between x to z are downloaded by the FATM, then the download mode may be set as "richness first" (that is, the user device tries to download the target video clips from the user device having most target video clips). By "richness first" mode, the connection of the user device are prevented to be changed frequently (if the firewall detects the connection of the user device is frequently changed, the firewall may regard this as a P2P flow behavior), and thus the user device will not be blocked by the firewall.

Because the video clips between y to z have long playback deadline, limitation on the download mode is less. Thus, the download mode is from z to y (that is, the video clip having earliest play time is downloaded firstly), or the download mode may be "Scarcity-first". Further, if the video clips between z to y are downloaded by the FATM, then the download mode may be set as "richness first". Further, the download mode may be a random mode, which is easy implementation.

When the download task determination module 220 estimates the future transmission rates, the position of the separation point "z" should be determined again. Thus, the transmission mode having higher transmission rate is assigned to download more video clips. Now descried is how to determine the separation point "z" and how to update the parameters "x", "y" and "z".

The parameter "x" is updated as the play time of the not-completely-downloaded video clip having earliest play time, and the parameter "y" is updated as the play time of the not-completely-downloaded video clip having latest play time.

Figure 6A:
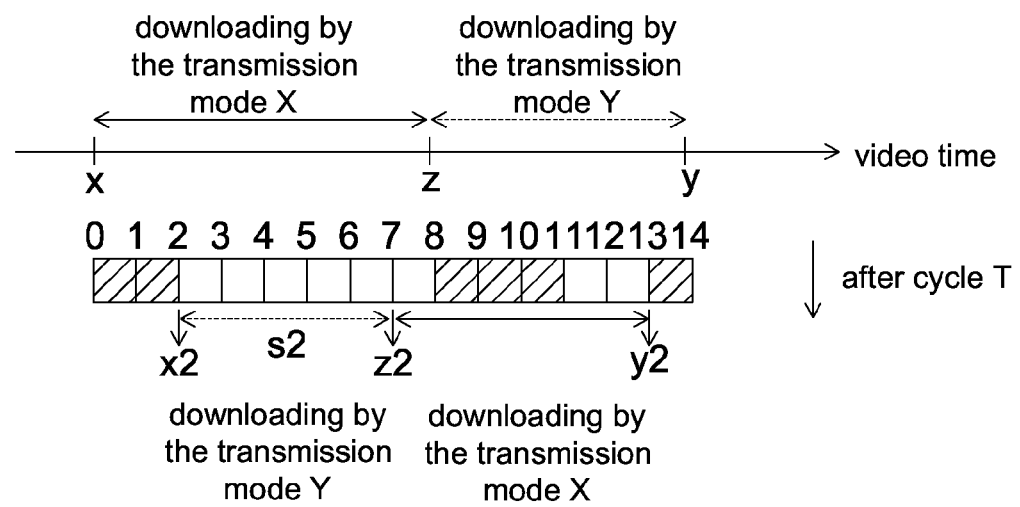
FIG. 6A and FIG. 6B show two examples of updating parameters x, y and z according to an embodiment of the disclosure.
Figure 6B:
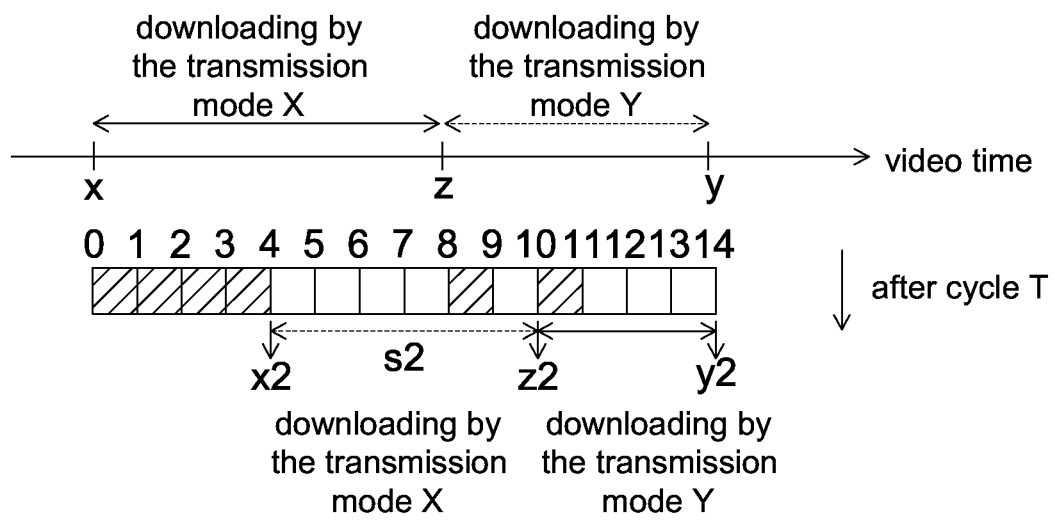

FIG. 6A and FIG. 6B show two examples of updating parameters x, y and z according to an embodiment of the disclosure. In FIG. 6A and FIG. 6B, it is supposed that the video data (which has 14 minutes) to be downloaded includes 14 video clips each including content of 1 minute video. For simplicity, the initial values of the parameter "x", "y" and "z" are set as 0, 14 and 8. The video clips which are downloaded completely are marked by slash region and the video clips which are not downloaded yet are marked by white region.

As shown in FIG. 6A, after the cycle T, in the region of x~z, the video clips including 0~2nd minute video are downloaded completely but the video clip including 2nd~8th minute video are not downloaded yet. The parameter "x" is updated as 2 (x2=2). After the cycle T, in the region of y~z, the video clips including 13th~14th minute video are downloaded completely but the video clip including 11th~13th minute video are not downloaded yet (although the video clips including 8th~11th minute video are downloaded completely). The parameter "y" is updated as 13 (y2=13).

Similarly, as shown in FIG. 6B, after the cycle T, in the region of x~z, the video clips including 0~4th minute video are downloaded completely but the video clip including 4th~8th minute video are not downloaded yet. The parameter "x" is updated as 4 (x2=4). After the cycle T, in the region of y~z, the video clips including 8th~9th minute video and the video clips including 10th~11th minute video are downloaded completely; but the video clip including 9th~10th minute video and the video clip including 11th~14th minute video are not downloaded yet. The parameter "y" is updated as 14 (y2=14).

Now how to determine the parameter "z" is described. Based on the download result, after the cycle T is elapsed, between x2~y2, the number of the video clips which are not downloaded yet is w2. The parameter s2 is expressed as: s2=w2*C(n)/(C(n)+D(n)). C(n) refers to the estimated transmission rate of the transmission mode which is assigned to download "to-be-played-soon region" in the next cycle; and D(n) refers to the estimated transmission rate of the transmission mode which is assigned to download "to-be-played-later region" in the next cycle. C(n)≥D(n). That is, C(n) is the larger one of A(n) and B(n) while D(n) is the smaller one of A(n) and B(n).

After the parameter s2 is determined, in the direction of from x2 to y2, the position of z2 is set as the s2-th not-completely-downloaded video clip after x2.

As shown in FIG. 6A, in the beginning, the user watches from the position x. After the cycle T, the transmission mode (which is called the transmission mode X) which downloads the video clips from x to z already downloads two video clips (which are marked by the slash regions) and the transmission mode (which is called the transmission mode Y) which downloads the video clips from z to y already downloads four video clips. For simplicity, the future transmission rate is estimated based on the average transmission rate of the previous cycle T. That is, the ratio of the predicted transmission rates of the two transmission modes X and Y are 2:4. There are eight video clips not downloaded yet (which are marked by white regions). Thus, the parameter s2 is defined as s2=8*4/(4+2)=5.33. After roundoff, s2≈5. Thus, in the direction from x2 to y2, the position of the fifth not-completely-downloaded video clip is the position of z2. As shown in FIG. 6A, x2+5(=2+5=7), and thus z2=7. That is, in FIG. 6A, after the cycle T is elapsed, the transmission mode Y downloads the video clips between x2~z2 and the transmission mode X downloads the video clips between z2~y2.

Similarly, in FIG. 6B, in the beginning, the user watches from the position x. After the cycle T, the transmission mode (which is called the transmission mode X) which downloads the video clips from x to z already downloads four video clips (which are marked by the slash regions) and the transmission mode (which is called the transmission mode Y) which downloads the video clips from z to y already downloads two video clips. For simplicity, the future transmission rate is estimated based on the average transmission rate of the previous cycle T. That is, the ratio of the predicted transmission rates of the two transmission modes X and Y are 4:2. There are eight video clips not downloaded yet (which are marked by white regions). Thus, the parameter s2 is defined as s2=8*4/(4+2)=5.33. After roundoff, s2≈5. Thus, in the direction from x2 to y2, the position of the fifth not-completely-downloaded video clip is the position of z2 (that is, the 10-th minute video clip). In FIG. 6B, the video clip including $8^{th}$~$9^{th}$ minute video is completely downloaded and thus, in calculation of z2, the video clip including $8^{th}$~$9^{th}$ minute video is excluded. That is, in FIG. 6B, after the cycle T is elapsed, the transmission mode X still downloads the video clips between x2~z2 and the transmission mode Y still downloads the video clips between z2~y2.

Besides, in switching the transmission mode, in order to prevent source waste, it will determine that the not-completely-downloaded video clip is still downloaded by the original transmission mode (before mode switch) or downloaded by the new transmission mode (after mode switch) again.

In here, the transmission mode switch refers to that, for example, in FIG. 6A, the transmission mode X downloads the "to-be-played-soon region" while the transmission mode Y downloads "to-be-played-later region". After the cycle T, the transmission mode Y (which has higher estimated transmission rate) downloads the "to-be-played-soon region" while the transmission mode X (which has lower estimated transmission rate) downloads "to-be-played-later region". Downloading the region is switched from one transmission mode to another transmission mode.

To switch the transmission mode, if the downloaded part of the video clip (containing $2^{nd}$~$3^{rd}$ minute video) is lower than a threshold (for example, 50%), then after transmission mode switches, the transmission mode Y downloads the video clip containing $2^{nd}$~$3^{rd}$ minute video. That is, the part of the video clip containing $2^{nd}$~$3^{rd}$ minute video, which is downloaded by the transmission mode X but not downloaded completely, will be discarded. However, to switch the transmission mode, if the downloaded part of the video clip containing $2^{nd}$~$3^{rd}$ minute video reaches the threshold, then after transmission mode switches, the transmission mode X still downloads the remaining part of the video clip containing $2^{nd}$~$3^{rd}$ minute video until the video clip containing $2^{nd}$~$3^{rd}$ minute video is downloaded completely. But after transmission mode switch, the transmission mode Y downloads the video clip containing $3^{rd}$~$4^{th}$ minute video (between x2~z2); and after the transmission mode X completely downloads the video clip containing $2^{nd}$~$3^{rd}$ minute video, the transmission mode X downloads the video clips between z2~y2. However, if the transmission mode X is the P2P transmission mode, then the transmission mode X may download the video clip containing $2^{nd}$~$3^{rd}$ minute video and the video clips between z2~y2 concurrently.

As described above, in the embodiment of the disclosure, if the user device is blocked by the firewall, the block user downloads data and provides VOD service by the FATM. On the contrary, if the user device is not blocked by the firewall, then the public user may download data and provide VOD service by either the FATM or the P2P transmission mode. Thus, the data sharing efficiency will be higher.

In the embodiment of the disclosure, the policy determination module (i.e. the policy determination implementation) determines whether to activate the FATM or the P2P transmission mode based on (1) whether there is a firewall which blocks or limits P2P flow; (2) the network environment of the user devices; and (3) the data storage status of the user devices. Although activation of more transmission mode increases transmission efficiency, this also increases control cost and computation cost. Thus, in the embodiment of the disclosure, if the public user detects there are other blocked user watching the same channel, the public user activates the FATM. If the public user detects there are other public user watching the same channel, the public user activates the P2P transmission mode. By so, a trade off between the transmission efficiency and the computation cost is made.

In the embodiment of the disclosure, the download task determination module (i.e. the download task determination implementation) periodically or non-periodically determines which of the two transmission modes has higher transmission rate, for assigning the transmission mode having higher transmission rate to download the "to-be-played-soon region" and for assigning the transmission mode having lower transmission rate to download the "to-be-played-later region". By so, the user experience will be improved because the "to-be-played-soon region" which will be played by the user device is downloaded by the transmission mode having higher transmission rate.

In the embodiment of the disclosure, the target clip selection module (i.e. the target clip selection implementation) assigns the download tasks of the two transmission modes based on data storage status of other user devices. In task assignment, the playback deadline and data scarcity are considered for better user entertainment experience and data sharing efficiency.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A network video-on-demand (VOD) service system, comprising:
    a plurality of user devices; and
    a server, coupled to the user devices;
    wherein in downloading a target data,
    if a P2P (peer-to-peer) transmission function of a first user device of the user devices is limited, the first user device activates an allowed transmission mode;
    if the P2P transmission function of the first user device is not limited, the first user device selectively activates the allowed transmission mode and a P2P transmission mode;
    the first user device analyzes respective transmission rates of the allowed transmission mode and the P2P transmission mode to determine respective download ranges of the allowed transmission mode and the P2P transmission mode;
    one of the allowed transmission mode and the P2P transmission mode having a higher transmission rate downloads a region close to a start of the target data while the other of the allowed transmission mode and the P2P transmission mode having a lower transmission rate downloads a region close to an end of the target data; and
    based on a target data storage status of other user devices, the first user device assigns download sequences of the allowed transmission mode and the P2P transmission mode in downloading a plurality of clips of the target data, to download the clips of the target data.

2. The network VOD service system according to claim 1, wherein
    the server includes a database which records whether each of a plurality of internet service provider limits the P2P transmission function; and
    if the first user device logs in, in response to a message from the first user device, the server informs the first user device whether the P2P transmission function of the first user device is limited or not.

3. The network VOD service system according to claim 1, wherein the first user device includes:
    a policy determination module;
    a download task determination module; and
    a target clip selection module;
    based on whether the P2P transmission function is limited or not, and whether there are other public users or other blocked users watching the same channel, the policy determination module determines whether to activate the P2P transmission mode and/or the allowed transmission mode; and
    if the P2P transmission mode and the allowed transmission mode are both activated, the policy determination module enables the download task determination module and the target clip selection module.

4. The network VOD service system according to claim 3, wherein:
    if the first user device newly adds into the network VOD service system, or a cycle is elapsed, or the first user device detects changes of an underlying network, the policy determination module detects a network environment of the first user device to determine whether the P2P transmission function of the first user device is limited or not;
    if the P2P transmission function of the first user device is not limited, the policy determination module detects whether there are other public users watching the same channel to determine whether to activate the P2P transmission mode;
    if the P2P transmission function of the first user device is not limited, the policy determination module detects whether there are other blocked users watching the same channel to determine whether to activate the allowed transmission mode; and
    if the P2P transmission function of the first user device is limited, the policy determination module activates the allowed transmission mode.

5. The network VOD service system according to claim 3, wherein:
    the download task determination module determines whether the target data has an assist file or not;
    if the target data has the assist file, the first user device downloads the assist file to test the respective transmission rates of the allowed transmission mode and the P2P transmission mode;
    the download task determination module determines one of the allowed transmission mode and the P2P transmission mode having a higher transmission rate downloads the region close to the start of the target data while the other of the allowed transmission mode and the P2P transmission mode having a lower transmission rate downloads the region close to the end of the target data;
    if the target data does not have the assist file, the download task determination module compares a number of public users having the target data and a number of blocked users having the target data;
    if the number of the public users having the target data is more, then the download task determination module selects the P2P transmission mode to download the region close to the start of the target data;
    if the number of the blocked users having the target data is more, then the download task determination module selects the allowed transmission mode to download the region close to the start of the target data; and
    based on past download status, the download task determination module estimates respective future transmission rates of the allowed transmission mode and the P2P transmission mode to determine whether to switch the download ranges of the allowed transmission mode and the P2P transmission mode.

6. The network VOD service system according to claim 5, wherein:
    when the download task determination module estimates the respective future transmission rates of the allowed transmission mode and the P2P transmission mode, the download task determination module sets a respective actual transmission rates of the allowed transmission mode and the P2P transmission mode in a previous cycle as the respective future transmission rates of the allowed transmission mode and the P2P transmission mode; or when the download task determination module estimates the respective future transmission rates of the allowed transmission mode and the P2P transmission mode, the download task determination module sets a result of weighting respective actual transmission rates of the allowed transmission mode and the P2P transmission mode in previous cycles by a weight parameter as the respective future transmission rates of the allowed transmission mode and the P2P transmission mode, wherein the actual transmission rate in a earlier cycle is weighted by a smaller weight parameter than the actual transmission rate in a later cycle.

7. The network VOD service system according to claim 3, wherein the target clip selection module determines a separation point based on a ratio of the transmission rates of the allowed transmission mode and the P2P transmission mode;

the separation point is between a first parameter and a second parameter;

the first parameter is related to one of not-completely-downloaded clips of the target data, having a smallest file position;

the second parameter is related to one of not-completely-downloaded clips of the target data, having a largest file position;

after a cycle is elapsed, based on a download status of the clips of the target data, the first and the second parameters are updated and a third parameter is provided based on a number of the not-completely-downloaded clips;

the separation point is updated as a position of the not-completely-downloaded clip related to the third parameter; and the target clip selection module assigns one of the allowed transmission mode and the P2P transmission mode having a higher transmission rate to download the not-completely-downloaded clips between the first parameter and the separation, and assigns the other one of the allowed transmission mode and the P2P transmission mode having a lower transmission rate to download the not-completely-downloaded clips between the separation and the second parameter.

8. The network VOD service system according to claim 7, wherein in transmission mode switch, based a download degree of a not-completely-downloaded clip, it is determined to download the not-completely-downloaded clip by the original transmission mode, which was assigned to download the not-completely-downloaded clip, or to discard the not-completely-downloaded clip.

9. The network VOD service system according to claim 7, wherein among the not-completely-downloaded clips between the first parameter to the separation point, a not-completely-downloaded clip having a smallest file position is downloaded first, or the not-completely-downloaded clips between the first parameter to the separation point are downloaded by a scarcity-first mode or a richness-first mode; and among the not-completely-downloaded clips between the separation point to the second parameter, a not-completely-downloaded clip having a smallest file position is downloaded first, or the not-completely-downloaded clips between the separation point to the second parameter are downloaded by a scarcity-first mode or a richness-first mode or a random mode.

10. A network video-on-demand (VOD) service method, comprising:

detecting whether a P2P (peer-to-peer) transmission function of a first user device of a plurality of user devices is limited;

if the P2P transmission function of the first user device is limited, activating an allowed transmission mode of the first user device;

if the P2P transmission function of the first user device is not limited, selectively activating the allowed transmission mode and a P2P transmission mode of the first user device;

analyzing respective transmission rates of the allowed transmission mode and the P2P transmission mode of the first user device to determine respective download ranges of the allowed transmission mode and the P2P transmission mode;

assigning one of the allowed transmission mode and the P2P transmission mode having a higher transmission rate to download a region close to a start of a target data;

assigning the other of the allowed transmission mode and the P2P transmission mode having a lower transmission rate to download a region close to an end of the target data; and based on a target data storage status of other user devices, assigning download sequences of the allowed transmission mode and the P2P transmission mode in downloading a plurality of clips of the target data, to download the clips of the target data.

11. The network VOD service method according to claim 10, further comprising:

if the first user device logs in, in response to a message from the first user device, requesting a database to know whether the P2P transmission function of the first user device is limited or not, the database recording whether each of a plurality of internet service provider limits the P2P transmission function.

12. The network VOD service method according to claim 10, wherein:

based on whether the P2P transmission function is limited or not, and whether there are other public users or other blocked users watching the same channel, determining whether to activate the P2P transmission mode and/or the allowed transmission mode.

13. The network VOD service method according to claim 12, wherein:

If the first user device newly adds, or a cycle is elapsed, or the first user device detects changes of an underlying network, detecting a network environment of the first user device to determine whether the P2P transmission function of the first user device is limited or not;

if the P2P transmission function of the first user device is not limited, detecting whether there are other public users watching the same channel to determine whether to activate the P2P transmission mode;

if the P2P transmission function of the first user device is not limited, detecting whether there are other blocked users watching the same channel to determine whether to activate the allowed transmission mode; and if the P2P transmission function of the first user device is limited, activating the allowed transmission mode.

14. The network VOD service method according to claim 12, wherein:
- determining whether the target data has an assist file or not;
- if the target data has the assist file, downloading the assist file to test the respective transmission rates of the allowed transmission mode and the P2P transmission mode;
- determining one of the allowed transmission mode and the P2P transmission mode having a higher transmission rate to download the region close to the start of the target data while the other of the allowed transmission mode and the P2P transmission mode having a lower transmission rate to download the region close to the end of the target data;
- if the target data does not have the assist file, comparing a number of public users having the target data and a number of blocked users having the target data;
- if the number of the public users having the target data is more, selecting the P2P transmission mode to download the region close to the start of the target data;
- if the number of the blocked users having the target data is more, selecting the allowed transmission mode to download the region close to the start of the target data; and
- based on past download status, estimating respective future transmission rates of the allowed transmission mode and the P2P transmission mode to determine whether to switch the download ranges of the allowed transmission mode and the P2P transmission mode.

15. The network VOD service method according to claim 14, wherein:
- in estimating the respective future transmission rates of the allowed transmission mode and the P2P transmission mode,
  - setting respective actual transmission rates of the allowed transmission mode and the P2P transmission mode in a previous cycle as the respective future transmission rates of the allowed transmission mode and the P2P transmission mode; or
  - setting a result of weighting respective actual transmission rates of the allowed transmission mode and the P2P transmission mode in previous cycles by a weight parameter as the respective future transmission rates of the allowed transmission mode and the P2P transmission mode, wherein the actual transmission rate in an earlier cycle is weighted by a smaller weight parameter than the actual transmission rate in a later cycle.

16. The network VOD service method according to claim 10, wherein:
- a separation point is determined based on a ratio of the transmission rates of the allowed transmission mode and the P2P transmission mode;
- the separation point is between a first parameter and a second parameter;
- the first parameter is related to one of not-completely-downloaded clips of the target data, having a smallest file position;
- the second parameter is related to one of not-completely-downloaded clips of the target data, having a largest file position;
- after a cycle is elapsed, based on a download status of the clips of the target data, the first and the second parameters are updated and a third parameter is provided based on a number of the not-completely-downloaded clips;
- the separation point is updated as a position of the not-completely-downloaded clip related to the third parameter; and
- one of the allowed transmission mode and the P2P transmission mode having a higher transmission rate is assigned to download the not-completely-downloaded clips between the first parameter and the separation, and the other one of the allowed transmission mode and the P2P transmission mode having a lower transmission rate is assigned to download the not-completely-downloaded clips between the separation and the second parameter.

17. The network VOD service method according to claim 16, wherein
- in transmission mode switch, based a download degree of a not-completely-downloaded clip, it is determined to download the not-completely-downloaded clip by the original transmission mode, which was assigned to download the not-completely-downloaded clip, or to discard the not-completely-downloaded clip.

18. The network VOD service method according to claim 16, wherein
- among the not-completely-downloaded clips between the first parameter to the separation point, a not-completely-downloaded clip having a smallest file position is downloaded first, or the not-completely-downloaded clips between the first parameter to the separation point are downloaded by a scarcity-first mode or a richness-first mode; and
- among the not-completely-downloaded clips between the separation point to the second parameter, a not-completely-downloaded clip having a smallest file position is downloaded first, or the not-completely-downloaded clips between the separation point to the second parameter are downloaded by a scarcity-first mode or a richness-first mode or a random mode.

* * * * *